HIGH FREQUENCY TUBE APPARATUS

Filed July 17, 1958 3 Sheets-Sheet 1

INVENTORS
Robert C. Schmidt
Robert S. Symons

BY Paul B. Hunter
Attorney

July 25, 1961 R. C. SCHMIDT ET AL 2,994,009

HIGH FREQUENCY TUBE APPARATUS

Filed July 17, 1958 3 Sheets-Sheet 2

INVENTORS
Robert C. Schmidt
Robert S. Symons

BY Paul B. Hunter
Attorney

HIGH FREQUENCY TUBE APPARATUS

Filed July 17, 1958 3 Sheets-Sheet 3

INVENTORS
Robert C. Schmidt
Robert S. Symons

BY

Paul B. Hunter
Attorney

United States Patent Office 2,994,009

Patented July 25, 1961

2,994,009

HIGH FREQUENCY TUBE APPARATUS

Robert C. Schmidt, Redwood City, and Robert S. Symons, Menlo Park, Calif., assignors to Varian Associates, Palo Alto, Calif., a corporation of California Filed July 17, 1958, Ser. No. 749,225

5 Claims. (Cl. 315—5.48)

The present invention relates in general to high frequency tube apparatus and more specifically, to a novel high frequency, high power velocity modulation tube which is extremely useful for providing a continuous wave output at high average powers and which is easily tunable over a wide frequency range. Such tubes are especially useful as output tubes in tropospheric forward scatter communication links, and for transmitting tubes covering the UHF–TV band.

Heretofore multi-cavity klystron amplifiers have been built which would provide high output powers in the order of 15 kw. average. These tubes were tunable over the heretofore relatively wide tuning range of approximately 10 percent. In these high power amplifiers the individual cavities were synchronously tuned by tuning plungers which varied predominately either the capacity or inductive parameters of the cavity.

The present invention provides a high power multi-cavity klystron amplifier capable of delivering average output powers in the order of 12 or more kw. and at the same time have the greatly enhanced tuning range of approximately 40 percent. The fourfold increase in tuning range has been obtained by the use of a novel cavity tuner in which both the inductive and the capacitive parameters are varied in a desired manner to tune the cavity. The provision of such a wide tuning range in one klystron amplifier results in substantial savings to the user of these tubes because the number of different tube types required to cover a certain bandwidth is greatly reduced. For example, heretofore, it required six different klystron amplifier tubes to cover the UHF–TV channels, 14–83. This entire band of frequencies may now be covered by only two tube types utilizing the features of the present invention. More specifically, two tubes utilizing the features of the present invention now adequately cover the frequency range from 470 megacycles to 1,000 megacycles.

The principal object of the present invention is to provide a novel high power high gain amplifier tube apparatus having exceptionally wide frequency tuning range which is especially useful, for example, in UHF–TV broadcasting and forward scatter communication.

One feature of the present invention is the provision of a novel cavity tuning apparatus which simultaneously changes, in the same sense, both the inductive and capacitive parameters whereby extremely wide tuning range may be obtained as desired.

Figures 1, 2, 3:
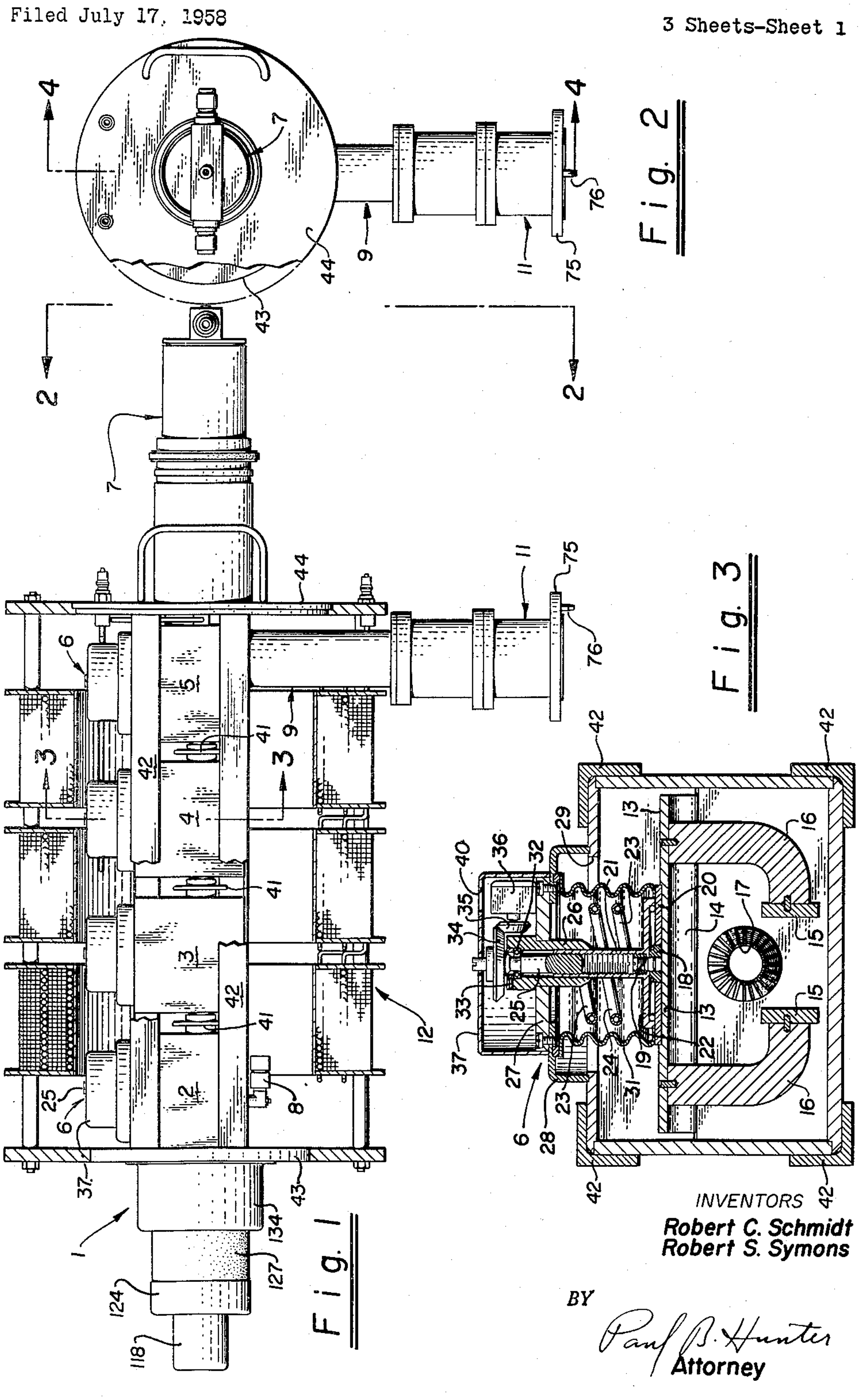
Figures 4, 5, 5A, 6:
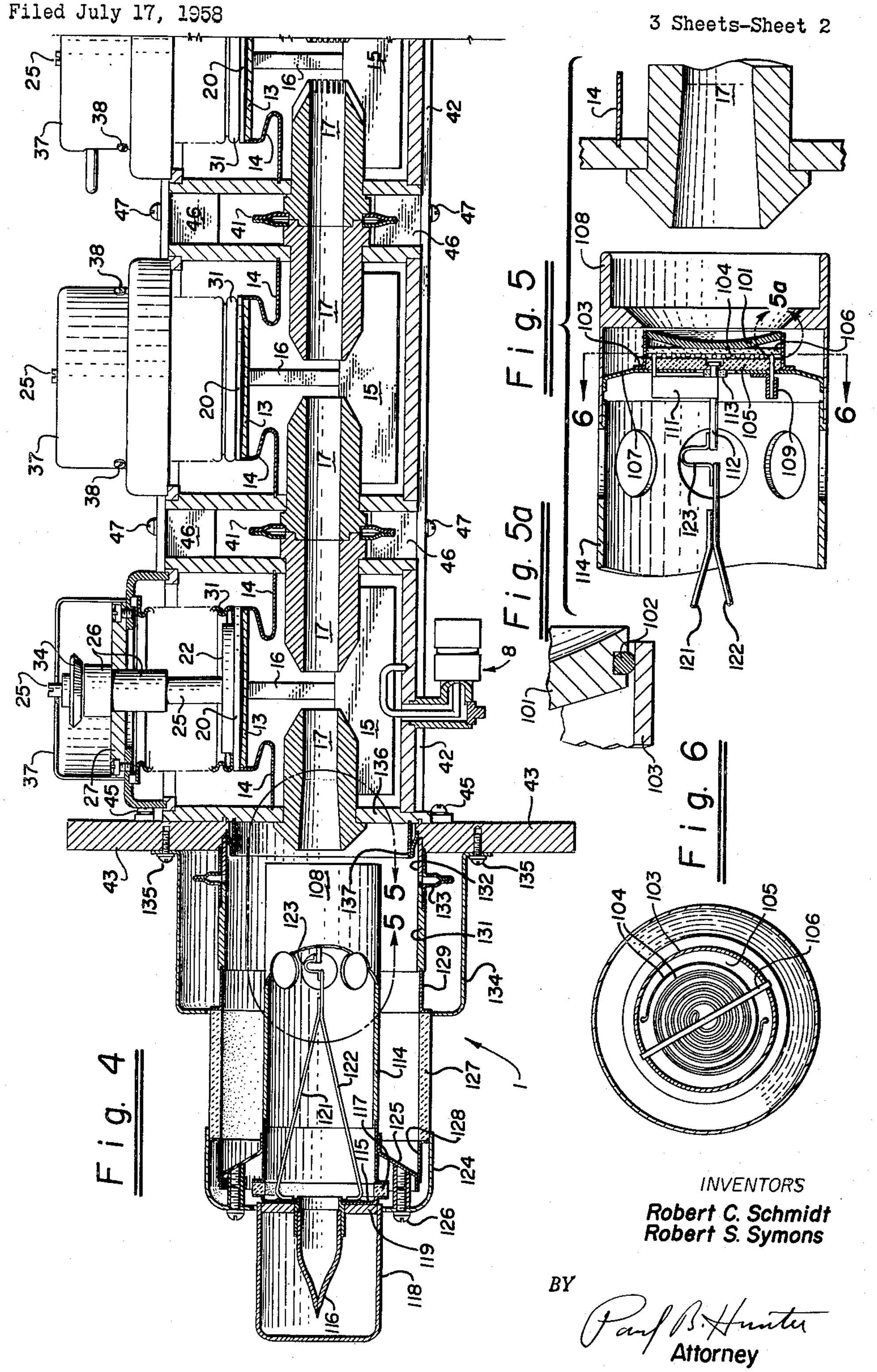
Figures 7, 8:
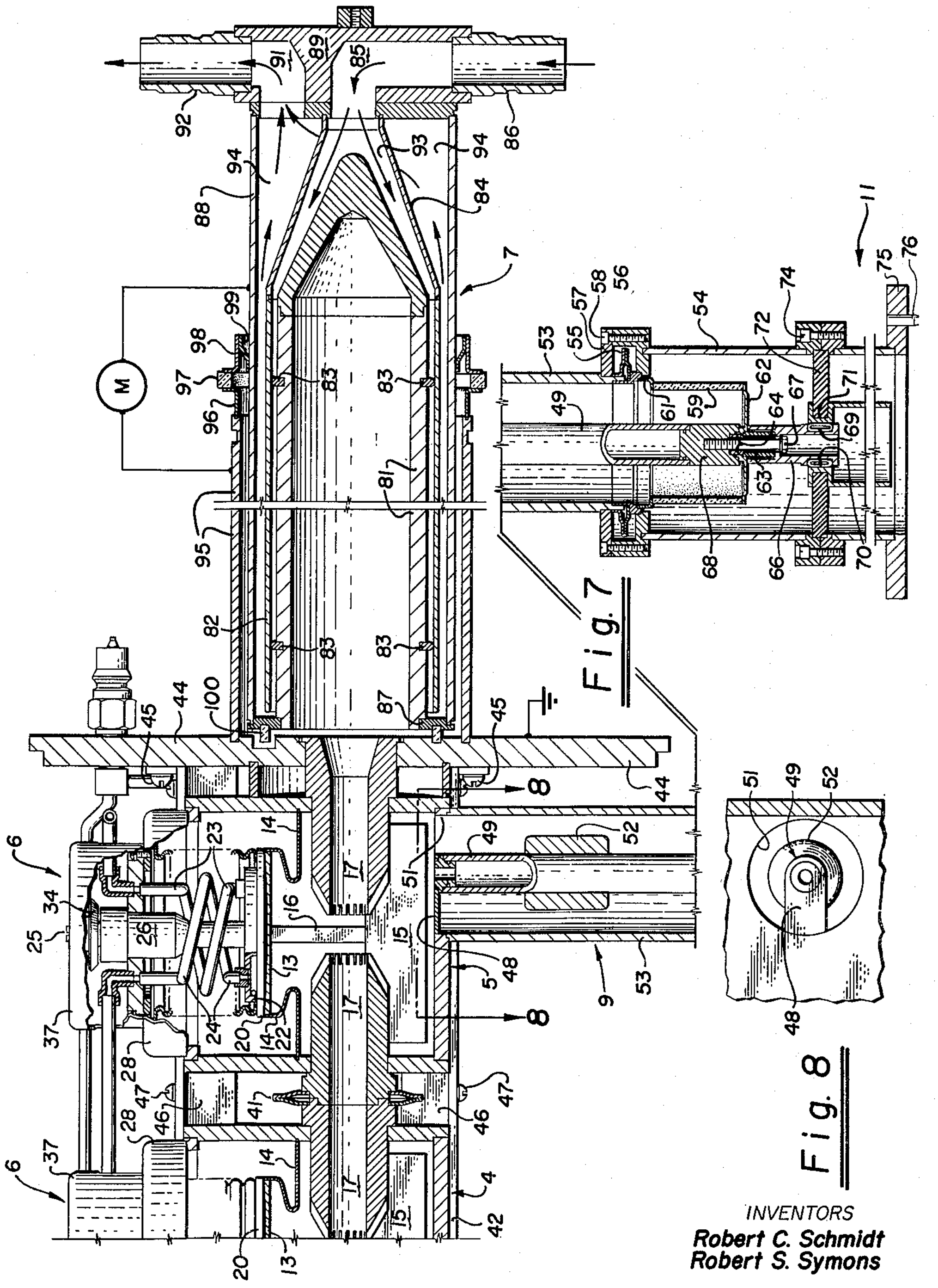

Other features and advantages of the present invention will become apparent upon a perusal of the following specification taken in connection with the accompanying drawings wherein, FIG. 1 is a side elevational view partly cut away of a novel high power klystron amplifier of the present invention, FIG. 2 is an end view of a portion of the structure of FIG. 1 taken along line 2—2 in the direction of the arrows, FIG. 3 is an enlarged cross sectional view of a portion of the structure of FIG. 1 taken along line 3—3 in the direction of the arrows, FIG. 4 is an enlarged cross sectional view of a portion of the structure of FIG. 2 taken along line 4—4 in the direction of the arrows, FIG. 5 is an enlarged detailed view of a portion of the structure of FIG. 4 delineated by line 5—5, FIG. 5*a* is an enlarged detailed view of a portion of the structure of FIG. 5 delineated by line **5*a*—5*a*, FIG. 6 is a cross sectional view of a portion of the structure of FIG. 5 taken along line 6—6 in the direction of the arrows, FIG. 7 is an enlarged cross sectional view of a portion of the structure of FIG. 2 taken along line 4—4 in the direction of the arrows, and FIG. 8 is a cross sectional view of a portion of the structure of FIG. 7 taken along line 8—8** in the direction of the arrows.

Referring now to the drawings there is shown in FIGS. 1 and 2 the external configuration of the novel tube apparatus of the present invention. More specifically, a segmented tubular cathode assembly 1 provides a source of electrons which are formed into a pencil-like beam and projected longitudinally of the tube apparatus. A plurality of rectangular cavity resonators including an input resonator 2, second and third buncher cavities 3 and 4, and an output cavity 5 are centrally apertured to allow the passage of the pencil-like beam of electrons therethrough.

The individual cavity resonators 2–5 are tunable over a wide range via a plurality of novel tuner assemblies 6 which will be more fully described later in the specification. The beam after passing through the output cavity resonator 5 is collected in a collector assembly 7. The thermal energy generated by the impinging electrons within the collector 7 is carried away by a fluid coolant circulated through the collector assembly 7.

R.F. signal energy, which it is desired to amplify, is fed to the input cavity 2 via a vacuum sealed coaxial connector 8. The signal energy velocity modulates the beam as it passes through the input cavity 2. The velocity modulation of the beam is transformed into current density modulation in the drift spaces between the input cavity 2 and the first buncher cavity 3. Buncher resonators 3 and 4 further velocity modulate the beam to produce greater current density modulation of the beam at the output cavity 5. The output cavity extracts R.F. energy from the current density modulated beam.

The output R.F. energy is coupled outwardly of the output resonator 5 via a vacuum sealed R.F. coaxial line 9 and fed to a suitable load, not shown, such as, for example, an antenna. The load is coupled to the coaxial line 9 via a novel coaxial connector assembly 11. A magnetic solenoid 12 circumscribes the central part of the tube apparatus, containing the cavity resonators, for providing a strong axial magnetic field longitudinally of the tube for confining the pencil-like beam of electrons.

The novel wide range tuner apparatus 6 of the present invention is shown in greater detail in FIGS. 3 and 4. More specifically, a conductive plate 13 as of, for example, copper has two thin conductive diaphragms 14 as of, for example, 0.015″ thick OFHC copper sheet fixed thereto as by, for example, brazing along opposite sides of the plate 13. The other ends of the thin metallic diaphragms 14 are fixedly secured as by, for example, brazing to opposite walls of the rectangular cavity resonators.

Two rectangular capacity plates or members 15 are carried upon the extremities of two capacity support arms 16 which in turn are carried from the rectangular diaphragm plate 13 at opposite sides thereof and in quadrature with the diaphragms 14. The capacity plates 15 are longitudinally symmetrically disposed with respect to the re-entrant portions of the drift tubes 17 within the cavity resonators.

In addition the capacity support arms 16 are disposed in a plane midway of the cavity end walls such that the longitudinal axis of the capacity support arms are disposed substantially in a plane of symmetry within the cavity resonator. In this manner circulating currents tending to flow in the capacity support arms 16 are minimized and undesired modes of oscillation associated with the support arm are not excited which might otherwise produce undesired R.F. heating of the support arms 16 or of other members associated with the tuning structure 6.

The capacity plates 15 serve to vary predominately the capacitive loading between the mutually opposed and spaced apart re-entrant portions of the drift tubes 17. The diaphragm plate 13 with its associated diaphragms 14 serve to vary predominately the inductive parameter of the cavity resonator by displacing the magnetic field. The diaphragm plate 13 with inwardly extending diaphragms 14 is claimed in a co-pending U.S. application, Serial No. 787,082, titled "High Power Klystron Tube Apparatus," invented by Richard L. Walter et al. Since the capacity plates 15 are disposed on the opposite side of the re-entrant portions of the drift tubes sections 17 from the tuner diaphragm plate 13, inward movement of the diaphragm plate 13 serves to decrease the inductance of the cavity and also to decrease the capacitance of the cavity. Conversely when the diaphragm plate 13 is moved outwardly of the cavity resonator the inductance is increased and the capacitance is increased. In this manner the combined capacitive and inductive tuner apparatus of the present invention has a greatly enchanced tuning effect because both the inductive and capacitive parameters of the cavity are being simultaneously varied in a complementary way to obtain large tuning effects with relatively small changes in the position of the tuning members.

A circular tuner cooling plate 20, see FIG. 3, as of, for example, (403) Monel is fixedly secured to the backside of the diaphragm plate 13 as by, for example, brazing. The tuner cooling plate 20 is centrally apertured and carries therefrom a raised internally threaded insert 18. A cap screw 19 threadably mates with the insert 18 and pulls a lip of a hollow internally threaded tuner drive shaft 21 down tightly against the insert 18. A centrally recessed circular flange 22 is carried at the end of the tuner drift shaft 21 and is also pulled tightly against the backside of the tuner cooling plate 20 by cap screw 19. The recessed portion of the circular flange 22 forms an annular coolant chamber. Two openings are cut through the flange 22 communicating with two hollow coolant tubes 23 and 24 respectively as of, for example, copper, which are wound in a helical configuration. One helical tube has a smaller diameter than the other and both are concentrically disposed of each other. One coolant carrying tube 23 serves to supply fluid coolant as of, for example, water to the hollow chamber between flange 22 and the tuner cooling plate 20. The other coolant carrying tube 24 serves to exhaust the hollow chamber and return the fluid to the coolant system. The helical configuration of the coolant tubes 23 and 24 serves to allow the tuning diaphragm plate 13 to enter into rectilinear translation within the cavity resonator without unduly stressing the coolant tube connections to the backside of the tuning apparatus. The above-described tuner cooling arrangement is claimed in a copending divisional application U.S. Serial No. 26,891, titled "High Frequency Tube Apparatus," invented by Walter E. Nelson.

A tuner drive screw 25 is externally threaded for mating with the internal threads of the hollow tuner drive shaft 21. The drive shaft 21 is captured against rotation by the provision of the diaphragms 14 which interconnect the cavity resonator wall and the diaphragm plate 13. The tuner drive screw 25 is captured against rectilinear translation in a manner which will be described later. Rotation of the tuner drive screw 25 causes the drive shaft 21 to travel inwardly and outwardly of the cavity resonator in variable accordance with the direction of rotation of the tuner drive screw 25.

A drive shaft bushing 26 as of, for example, brass is carried transversely of an apertured tuner drive base plate 27. The tuner base plate 27 is carried over a central opening in the bottom of a cavity adaptor cup 28 as of, for example, 403 Monel. The cavity adaptor cup 28 is sealed in a vacuum tight manner at its large open end over a circular tuner access port 29 in the cavity side wall.

A flexible metallic bellows 31 as of, for example stainless steel is fixedly secured in a vacuum tight manner at one end thereof to the inside surface of the tuner adaptor cup 28 and is sealed at its other end to the tuner cooling plate 20 as by, for example, brazing. The bellows 31 serve as a flexible vacuum seal for sealing the tuner actuating mechanism from the tuning elements disposed within the cavity resonator thereby premitting translation of these tuning elements within the cavity without destroying the vacuum integrity thereof.

A ball bearing race assembly 32 is carried at an internal shoulder of the tuner drive shaft bushing 26 substantially at the open end thereof via a plurality of set screws 33 radially extending inwardly of the tuner bushing 26. An external shoulder of the tuner drive screw 25 abuts the ball bearing assembly 32 and is thereby captured against translating outwardly of the tuner drive shaft bushing 26.

A bevel gear 34 is fixedly carried upon the tuner drive screw 25 substantially at one end thereof via a plurality of set screws. The bevel gear 34 mates with a second bevel gear 25 connected to a drive shaft communicating with digital indicating counter 36.

Since rotation of the tuner drive screw 25 is transformed directly into movement of the tuning elements within the cavity a count of the revolutions of the tuner drive screw 25 is a direct measure of the position of the tuning elements within the cavity and therefore a measure of the frequency of the cavity resonator. Tuning characteristic graphs may be prepared correlating the digital information with the resonant frequency of the cavity.

A cup-shaped tuner cover 37 covers over the bevel gears 34 and 35 and the digital indicating counter 36. The tuner cover 37 is fixedly secured to the tuner base plate 27 via a plurality of screws 38, see FIG. 4. The tuner cover 37 is centrally apertured to allow the tuner drive screw 25 to protrude slightly from the cover to facilitate access thereto. In addition a rectangular aperture 40 is provided in the tuner cover 37 opposite the digital indicating counter 36 to permit visual observation of the count. The tuner cover 37 is further apertured at the side to permit the coolant tubes 23 and 24 to pass therethrough communicating with remainder of the cooling system.

The cavity resonators (see FIGS. 4 and 7) 2, 3, 4 and 5 are successively arranged along the beam path for successive electromagnetic interaction with the beam of electrons passable therethrough. The drift tube segments 17, between successive cavities, are sealed together in a vacuum tight manner via a welded copper flange 41. The cavity resonators are held together in longitudinal alignment via four angle rods 42 as of, for example, stainless steel extending longitudinally of the tube apparatus. The angle rods 42 are fixedly secured at their ends to transversely extending annular magnetic pole pieces 43 and 44 via a plurality of screws 45. In addition the cavity resonators are separated via a plurality of stainless steel blocks 46 carried from the angles 42 via a plurality of screws 47. The cavity assemblies provided with the strengthening angle rods 42 and separating blocks 46 provides a rigid assembly which is not susceptible to sagging or inadvertent bending in adverse thermal environments thereby enhancing the electrical stability of the amplifier apparatus.

The mutually opposing free end portions of the drift tubes 17, within cavities 4 and 5, are serrated to prevent the occurrence of multipactor which would adversely affect the power output of the tube apparatus.

An output coupling loop is formed by a strap 48 as of, for example, copper interconnecting the hollow center conductor 49 of the output coaxial line 9 and the inside wall of the cavity resonator 5. The coaxial line 9 intersects with the hollow interior of the output cavity 5 via an output port 51.

A capacitive loading slug 52 as of, for example, copper is fixedly secured to the inner conductor 49 of the output coaxial line 9. The loading slug 52 is disposed in close proximity to the output coupling loop 48 and provides a fixed capacitive discontinuity associated with the loop 48 whereby the desired increasing sending end conductance versus frequency characteristic is obtained allowing a broad band match between the output waveguide and the cavity without adjusting the coupling.

The fixed capacitive loading slug 52, positioned as shown, requires no adjustment over the range of the tube, as frequently required in the past. This high frequency coupling apparatus is taught and claimed in a co-pending application, Serial No. 604,535, filed Aug. 16, 1956, entitled High Frequency Apparatus, invented by Richard B. Nelson et al., now Patent No. 2,895,110.

The outer conductor 53 of the coaxial line 9 is sealed to a larger diameter section 54 to accommodate therewithin the wave permeable vacuum sealed window assembly which will be more fully described later. The outer conductor 53 is connected to the larger outer conductor 54 in a vacuum tight manner via the intermediary of a welded flange seal 55. The relatively fragile flange seal 55 is protected by an internally recessed seal protector 56 carried at one end of the outer conductor 54. The recessed portion of the seal protector 56 is closed off via an annular flange 57 carried at the extremity of the smaller outer conductor 53. The seal protector 56 and flange 57 are pulled together via a plurality of cap screws 58 spaced about the perimeter of the flange 57.

The inner conductor 49 of the coaxial transmission line 9 is vacuum sealed to the enlarged outer conductor 54 via the intermediaries of a hollow cylindrical wave permeable window member 59 as of, for example, ceramic. The ceramic window 59 is carried from the outer conductor 53 via a thin cylindrical metallic frame 61 as of, for example, copper which is secured to the ceramic window 59 at one end thereof as by, for example, brazing to a metalized layer on the ceramic. The other end of the cylindrical frame 61 is secured to the outer conductor 53 of the coaxial transmission line 9 as by, for example, brazing. The relatively thin cylindrical window frame member 61 allows for thermal expansion and contractions of the coaxial line 9 and window assembly during operation of the tube.

The other end of the ceramic R.F. window 59 as carried from the center conductor 49 of the coaxial transmision line 9 via a thin annular metallic disk 62 having a central sleeve 63 extending axially of the seal and tightly fitting over a hollow cylindrical extension 64 of the center conductor 49. The sleeve 63 and the center conductor cylindrical extension 64 are sealed together at their free ends 65 via, for example, a weld. The thin annular disk 62 is sealed at its peripheral edge in a vacuum tight manner to one end of the cylindrical wave permeable window 59 as by, for example, brazing to a metalized layer on the window 59.

A coupling segment 66 of the hollow center conductor 49 is pulled tightly over the sleev 63 of the disk 62 via a cap screw 67. The cap screw 67 is carried internally of the coupling segment 66 and picks up a thread provided in a plug 68 closing off the hollow center conductor 49.

A tension spring 69 is wound in a helix of oval cross section and doubled back on its self to form a resilient ring. The spring 69 is carried within an annular recess provided at the end of the coupling segment 66 and is made of a conductive material as of, for example, silver plated Phosphor bronze. The spring 69 as carried within the recessed coupling segment 66 provides a surface of slightly larger diameter than the adjoining center conductor. The spring 69 bears in radial engagement with a concentrically disposed female inner conductor receptacle 70 of the coaxial connector assembly 11. The female recepticle 70 is provided with an external annular recess 71 at the innermost end for carrying therewithin an annular dielectric support 72 as of, for example, tetrafluoroethylene resin. The support 72 is carried at its outer perimeter within a recess provided in mating flange portions of the outer conductor 54 and of the outer conductor 54 of the coaxial connector 11.

The mating flanges are pulled together via a plurality of cap screws 74 positioned about the perimeter thereof. The outer conductor 54 of the coaxial connector 11 is provided with an output flange 75 for mating with coaxial flanges, not shown, provided on equipment to which the tube apparatus is connected. An alignment pin 76 is provided on the output flange for mating with an aligning hole in the mating flange, not shown.

The coaxial connector assembly 11 incorporating the spring 69 and annular support 72 allows the female receptacle to be coupled to a male plug connector provided on equipment, not shown, without transmitting strains through the center conductor of the coaxial connector 11 to the fragile vacuum sealed R.F. window 59. Such strains which are often produced while coupling and decoupling large and heavy equipments are quite likely to produce fractures of the relatively fragile window 59 if means such as, for example, the spring 69 and the annular support 72 are not provided to decouple these strains from the window 59. The above-described strain relieved connector assembly is claimed in a copending divisional application, U.S. Serial No. 26,891, titled "High Frequency Tube Apparatus," inventor Walter E. Nelson.

The collector assembly 7 serves to collect the electron beam after it passes through the output cavity 5. In the collector assembly 7, a hollow cylindrical collector member 81 is provided with an inwardly coverging end portion and is positioned concentrically of the longitudinal axis of the beam. The collector member 81 uniformly collects the electrons evenly along the inside surface thereof. The electrons have a uniform distribution over the interior surface of the collector 81 because of the space charge forces of the beam which tend to cause it to expand due to the diverging magnetic field which in the collector region has an increasing component at right angles to the surface of the collector longitudinally thereof.

A cylindrical coolant septum 82 is disposed concentrically of the hollow collector 81 and is slightly spaced apart therefrom via a plurality of spacing pins 83. A substantially frustro conical adaptor 84 is carried from one end of the collector septum 82 and at its open end communicates with an L-shaped inlet chamber 85. A quick disconnect fitting 86 connects an input tubulation to the inlet chamber 85. The other end of the coolant septum 82 is slightly spaced apart from an annular end wall 87.

A hollow cylindrical collector jacket 88 is sealed to the periphery of the annular wall 87 and is disposed concentrically of and slightly spaced apart from the coolant septum 82. The collector jacket 88 is closed off at its other end via a coolant distribution block 89 carrying therewithin the input coolant channel 85, a similar output coolant channel 91, and quick disconnect fitting 92 communicating with the coolant return system via exhaust tubulation, not shown.

In operation coolant flows into the chamber 93 defined by the annular space between the collector 81 and the collector septum 82 thereby carrying away excess heat generated in the collector 81. The coolant returns via the second annular chamber 94 defined by the space between the collector septum 82 and the collector jacket 88 and thence via coolant outlet chamber 91 and quick disconnect fitting 92 to the coolant return system.

The collector assembly 7 is carried from the annular magnet pole piece 44 via a hollow cylindrical collector adapter 95. A flanged annular frame member 96 is fixedly secured to the collector adaptor 95 substantially at one end thereof and is sealed in a vacuum tight manner to an annular insulating member 97 as of, for example, ceramic. The other side of the annular insulator 97 is sealed in a vacuum tight manner to a second annular frame 98. The annular frame 98 is sealed as by, for example, a weld to an annular metal ring 99 brazed to the collector jacket 88.

The annular end wall 87 of the collector assembly 7 which abuts the magnetic pole piece 44 is electrically insulated therefrom via an annular insulating ring 100 as of, for example, ceramic. The collector assembly 7 is thus insulated from the main tube body via the insulators 97 and 100. A current meter M is connected across the insulator 97 such that the interception of the beam current on parts of the tube excluding the collector which is insulated from the grounded tube body may be monitored.

The cathode assembly 1 (FIGS. 4, 5, 5*a* and 6) includes therewithin a concave tungsten impregnated barium aluminate cathode emitter button 101 operating at approximately 1000–1100° C. and carried from its peripheral edge via a refractive metal ring 102 as of tungsten riding within a peripheral recess in the cathode emitter 101 and being spot-welded to a hollow cylindrical button support 103 as of tantalum. A cathode heating element 104 as of, for example, non-electrically insulated 0.030″ diameter tungsten wire is wound in a double spiral configuration. The heating element 104 operates at 1700° C. and is held tightly against a refractory dielectric disk 105 as of alumina ceramic via a refractory dielectric rod 106 as of, for example, sapphire extending across the double spiral wound heater 104. The rod 106 is held tightly against the heating element 104 by a flat ground on the backside of the cathode emitter 101.

The ceramic disk 105 affords a uniform electrically insulated support for the bare heater element 104 without conducting excessive heat from the element 104. The sapphire rod 106 assures uniform support for the heating element 104 without shorting the element 104 and without intercepting excessive radiant heat therefrom. The interturn spacing of the heater filament 104 allows for creepage of the filament 104 without shorting adjacent turns. This cathode heater assembly is claimed in copending divisional application U.S. Serial No. 26,870 for "High Frequency Tube Apparatus," invented by Joseph K. Mann.

A transverse cathode header 107 as of tantalum has affixed thereto the hollow cylindrical cathode button support 103 and is secured at its peripheral edge to a hollow cylindrical focus electrode 108 as of, for example, titanium. The transverse cathode header 107 and dielectric disk 105 as of alumina are suitably apertured to allow the cathode heater leads 104 to extend through the cathode header 107.

One heater lead 104 is spot-welded to a metal tab 109 secured to the backside of the cathode header 107. The other heater lead 104 is secured via a crossover conducting bar 111 to a center heater lead 112. The center heater lead 112 is carried at its flared end from the centrally apertured ceramic disk 105. The flared end of the center conductor 112 is pulled tightly against an inner shoulder of the apertured ceramic disk 105 via an annular ceramic spacer 113 positioned between the transverse header 107 and the transversely extending conducting bar 111.

The cylindrical focus electrode 108 is carried at the end of a hollow cylindrical cathode support 114 which is closed off at the other end thereof via a heater cup 115 centrally apertured to carry therefrom an exhaust tubulation 116 which is suitably pinched off after the tube has been evacuated. The heater cup 115 is electrically insulated from the tubular cathode support 114 via an annular insulator 117 as of, for example, ceramic.

A cup-shaped heater terminal 118 as of, for example, aluminum is provided with threads internally thereof substantially at the open end thereof for mating with the external threads of a heater terminal adaptor 119 carried from and externally of the heater cup 115. The center heater lead 112 is provided with two supporting leg portions 121 and 122 which are fixedly secured as by, for example, spot-welding to the heater cup 115 and which are jointed together as by, for example, spot-welding at the other ends thereof to form a lower portion of the center heater lead 112. The lower portion of the heater lead 112 is joined to the upper portion via a metal strap 123 spot-welded to the two heater lead portions.

The cup-shaped heater terminal 118 makes contact with one terminal of the heater current source, not shown, and the other terminal of the heater source, not shown, makes contact with a centrally apertured cathode terminal 124 carried from the cathode support 114 via an annular cathode adaptor ring 125 and a plurality of machine screws 126. The heater current thus flows into the heater terminal 118 thence via heater cup 115 and the two legs 121 and 122 of the heater lead 112 and heater crossover bar 111 to the spiral wound heater element 104. The current returns from the heater element 104 via tab 109 and the cylindrical cathode support 114 thence via the annular cathode adaptor ring 125 and machine screws 126 to the cup-shaped cathode terminal 124.

A high voltage hollow cylindrical cathode insulator as of, for example, ceramic is carried at one end thereof via a first annular frame member 128 as of Kovar which is fixedly secured in a vacuum tight manner at one end thereof to the outer peripheral edge of the cathode adaptor ring 125 as by, for example, a weld. The other end of the high voltage insulator 127 is secured to a second annular insulator frame member 129 as of, for example, Kovar. The window frame member 129 is in turn sealed to a hollow cylindrical magnetic cathode shield 131 as by, for example, brazing. The cathode magnetic shield is made of a magnetically permeable material as of, for example, iron and serves to shield the emitter button 101 from the beam confining magnetic field. The cathode shield 131 is sealed to a cylindrical cathode shield adaptor 132 via the intermediary of a welded flange seal 133. The cylindrical cathode shield adaptor 132 is carried from the annular magnetic pole piece 43 as by, for example, brazing.

A centrally apertured cup-shaped cathode seal protector 134 circumscribes the welded cathode flange seal 133 and is carried from the annular pole piece 43 via a plurality of screws 135 spaced about the seal protector 134. A transverse wall 136 of the input cavity resonator 2 serves as a portion of the centrally apertured anode of the tube apparatus and is sealed to and carried from the annular pole piece 43 via a welded flange seal 137.

In operation a potential of approximately 16 kv. more negative than the potential of the anode 136 is applied to the cathode button 101 via cathode terminal 124. A beam of electrons is caused to be emitted from the cathode emitter 101 and projected through the anode 136 and through the flared entrance of the first drift tube section 17. At this point the beam enters the beam confining magnetic field which is directed longitudinally of the tube and serves to confine the beam against its radially exerted space charge expansion forces.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency klystron tube apparatus including, a hollow substantially enclosed cavity resonator adapted for electromagnetic interaction with a beam of charged particles passable therethrough, means for changing the inductance of said cavity resonator to change the resonant frequency thereof, and means disposed within said hollow resonator cavity for simultaneously changing the capacitance of said cavity resonator in the same sense as the change in inductance whereby wide tuning range of the klystron tube apparatus is obtained.

2. In an apparatus as claimed in claim 1 wherein said means for changing the inductance includes a movable member for changing the volume of the cavity resonator.

3. In an apparatus as claimed in claim 2 wherein said means for changing the capacitance includes a plate movable predominately in the region of strong electric field within said cavity resonator.

4. A high frequency klystron tube apparatus including, a re-entrant hollow substantially enclosed cavity resonator adapted for electromagnetic interaction with a beam of electrons passable therethrough, said cavity resonator having re-entrant portions defining a gap therebetween, a movable wall for changing the inductance of said cavity resonator by changing the volume of said cavity resonator to thereby change the resonant frequency of the cavity resonator as desired, a pair of capacitive tuning plates connected to said movable wall and movable in variable accordance with the movements of said wall, and said capacitive tuning plates being positioned on the opposite side of said re-entrant portions of said cavity resonator from said movable wall whereby movements of said movable wall produce like changes in the inductance and capacitance of the cavity and wide tuning range of the tube apparatus is obtained.

5. A high frequency klystron tube apparatus including, a doubly re-entrant hollow substantially enclosed cavity resonator adapted for electromagnetic interaction with a beam of electrons passable therethrough, said doubly re-entrant cavity portions directed lengthwise of said cavity resonator and defining an interaction gap therebetween, a movable wall for changing the inductance of said cavity resonator by changing the volume of said cavity resonator to thereby change the resonant frequency of said cavity resonator as desired, a capacitive tuning member connected to said movable wall via the intermediary of a member support arm and movable in variable accordance with the movements of said wall, said capacitive tuning member being positioned on the opposite side of said doubly re-entrant portions of said cavity resonator from said movable wall whereby movements of said movable wall produce like changes in the inductance and capacitance of the cavity and wide tuning range of the tube apparatus is obtained, and said tuning member support arm being positioned midway lengthwise of said cavity resonator whereby excitation of undesired modes of oscillations associated with said member support arm are prevented in use.

References Cited in the file of this patent

UNITED STATES PATENTS

| | | |
|---|---|---|
| 2,481,171 | Spencer | Sept. 6, 1949 |
| 2,496,887 | Nelson | Feb. 7, 1950 |
| 2,512,901 | Litton | June 27, 1950 |
| 2,606,302 | Learned | Aug. 5, 1952 |
| 2,757,314 | Sheppard et al. | July 31, 1956 |
| 2,846,614 | Espersen | Aug. 5, 1958 |
| 2,876,383 | Crapuchettes | Mar. 3, 1959 |